United States Patent
Shimizu

(10) Patent No.: US 10,068,507 B2
(45) Date of Patent: Sep. 4, 2018

(54) VISIBLE IMAGE FORMING APPARATUS AND IMAGE FORMING APPARATUS

(71) Applicant: KYOCERA Document Solutions Inc., Osaka (JP)

(72) Inventor: Takeo Shimizu, Osaka (JP)

(73) Assignee: KYOCERA Document Solutions Inc., Tamatasukuri, Chuo-ku, Osaka (JP)

(*) Notice: Subject to any disclaimer, the term of this patent is extended or adjusted under 35 U.S.C. 154(b) by 0 days.

(21) Appl. No.: 15/550,121

(22) PCT Filed: Mar. 25, 2016

(86) PCT No.: PCT/JP2016/059772
§ 371 (c)(1),
(2) Date: Aug. 10, 2017

(87) PCT Pub. No.: WO2016/158803
PCT Pub. Date: Oct. 6, 2016

(65) Prior Publication Data
US 2018/0102076 A1    Apr. 12, 2018

(30) Foreign Application Priority Data
Mar. 30, 2015  (JP) .................. 2015-069237

(51) Int. Cl.
*G09F 19/18* (2006.01)
*G02B 27/22* (2018.01)
(Continued)

(52) U.S. Cl.
CPC ............ *G09F 19/18* (2013.01); *G02B 27/22* (2013.01); *G02B 27/2292* (2013.01);
(Continued)

(58) Field of Classification Search
CPC ........ G03B 21/10; G03B 21/62; G03B 21/34; G03B 21/147; G03B 19/22; G09F 19/18; G09F 19/22
See application file for complete search history.

(56) References Cited

U.S. PATENT DOCUMENTS 7,533,995 B2  5/2009  Momiuchi et al.
7,766,485 B2  8/2010  Momiuchi et al.
(Continued)

FOREIGN PATENT DOCUMENTS

JP  2003-233339 A  8/2003
JP  2007-206588 A  8/2007
(Continued)

*Primary Examiner* — Sultan Chowdhury
(74) *Attorney, Agent, or Firm* — IP Business Solutions, LLC

(57) ABSTRACT

An image forming apparatus 1 includes an image forming unit 12 that forms an image on a recording medium, a visible image forming unit 50 that forms a visible image in the air, a controller 100 that causes the visible image forming unit 50 to form the visible image representing a print image, an operation detection unit 60 that detects an operation of an operator performed on the print image displayed as the visible image by the visible image forming unit 50, and a print image processing unit 101 that processes the print image according to the operation detected by the operation detection unit 60. The controller 100 causes the visible image forming unit 50 to form, in the air, the visible image representing the print image processed by the print image processing unit 101.

6 Claims, 11 Drawing Sheets

(51) Int. Cl.
*H04N 1/00* (2006.01)
*G03B 21/00* (2006.01)
*G03G 15/00* (2006.01)

(52) U.S. Cl.
CPC ......... *G03B 21/00* (2013.01); *G03G 15/5016* (2013.01); *H04N 1/00* (2013.01)

(56) References Cited

U.S. PATENT DOCUMENTS

| | | | |
|---|---|---|---|
| 2004/0032573 A1* | 2/2004 | Silverbrook | B41J 3/445 353/122 |
| 2005/0068999 A1 | 3/2005 | Momiuchi et al. | |
| 2006/0017887 A1* | 1/2006 | Jacobson | G03B 21/10 353/30 |
| 2008/0174747 A1* | 7/2008 | Fujinawa | B41J 3/44 353/122 |
| 2009/0086173 A1* | 4/2009 | Combs | G03B 21/134 353/122 |
| 2009/0213340 A1 | 8/2009 | Momiuchi et al. | |
| 2013/0298029 A1* | 11/2013 | Natori | G06F 3/0484 715/731 |

FOREIGN PATENT DOCUMENTS

| JP | 2010-078623 A | 4/2010 |
|---|---|---|
| JP | 2013-127625 A | 6/2013 |

* cited by examiner

VISIBLE IMAGE FORMING APPARATUS AND IMAGE FORMING APPARATUS

TECHNICAL FIELD

The present invention relates to a visible image forming apparatus and an image forming apparatus, and in particular to a technique to form a print image as visible image in the air.

BACKGROUND ART

Nowadays, display devices that form a visible image in the air to display required information have been developed. For example, Patent Literatures (PTL) 1 and 2 cited below disclose a visible image forming apparatus that intermittently emits an invisible laser beam, and generates plasma by collecting the laser beam with lenses and mirrors, to thereby form the visible image representing characters and pictures in the air, on the basis of the visible light from the plasma thus generated.

In addition, PTL 3 cited below proposes an in-vehicle aerial imaging apparatus that forms a visible image in a space inside a vehicle to thereby display required information. The in-vehicle aerial imaging apparatus is configured to display the information required by the passenger of the vehicle at a position inside the vehicle interior that is easy for the passenger to visually recognize, instead of on a display panel attached inside the vehicle interior.

Further, an optical imaging apparatus according to PTL 4 cited below is configured to receive and reflect light from an object or a display device, and converge the reflected light at a position symmetrical to the object or the display device with respect to the optical image forming device, to thereby form an object image in the air.

CITATION LIST

Patent Literature

[PTL 1] Japanese Unexamined Patent Application Publication No. 2003-233339
[PTL 2] Japanese Unexamined Patent Application Publication No. 2007-206588
[PTL 3] Japanese Unexamined Patent Application Publication No. 2010-78623
[PTL 4] Japanese Unexamined Patent Application Publication No. 2013-127625

SUMMARY OF INVENTION

Apart from the above, image forming apparatuses are known that are configured as a multifunction peripheral having a plurality of functions such as copying, printing, scanning, facsimile transmission, and so forth. The image forming apparatus includes a display unit, for example an LCD panel, and when a preview of a print image is displayed on the display unit, the operator can confirm how the image is printed (formed) on a paper sheet (recording medium).

However, the screen size of the display unit is relatively small, and therefore sufficient details of the print image are unable to be expressed in the preview display. In this relation, the techniques according to PTL 1 to 4 cited above may be applied to display the print image in a large region in the air. However, since the print image in the preview display is a two-dimensional image, it is impossible to display how the actual printed material looks like when, for example, the printed material is folded or rolled.

The present invention has been accomplished in view of the foregoing situation, and provides a technique to display a print image representing a result of a processing performed thereon, when an operator performs the processing on the print image displayed in the air, for example folding or rolling.

In an aspect, the present invention provides a visible image forming apparatus including a visible image forming unit that forms a visible image in the air,
a controller that causes the visible image forming unit to form the visible image representing a print image,
an operation detection unit that detects an operation of an operator performed on the print image displayed as the visible image by the visible image forming unit, and
a print image processing unit that processes the print image according to the operation detected by the operation detection unit.

The controller causes the visible image forming unit to form, in the air, the visible image representing the print image processed by the print image processing unit.

In another aspect, the present invention provides an image forming apparatus including the foregoing visible image forming apparatus, and
an image forming unit that forms an image on a recording medium.

The controller causes the visible image forming unit to form, in the air, the visible image representing the print image based on image data to be formed into an image by the image forming unit.

Advantageous Effects of Invention

The apparatuses configured as above enable a print image representing a result of a processing performed thereon to be displayed in the air, when an operator performs the processing on the print image displayed in the air, for example folding or rolling.

DESCRIPTION OF EMBODIMENTS

Figure 1:
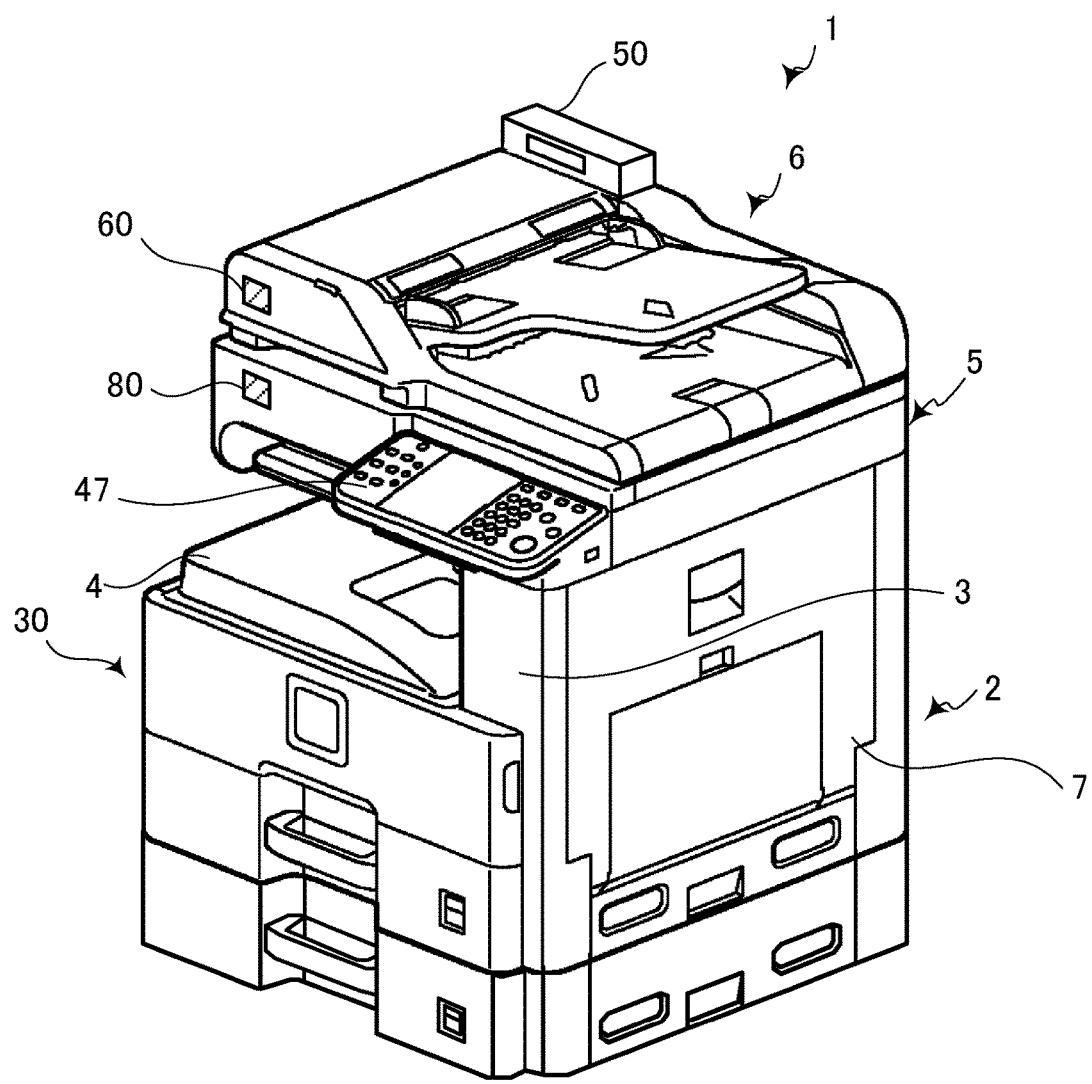
FIG. 1 is a perspective view showing an appearance of an image forming apparatus according to an embodiment of the present invention.

Hereafter, a visible image forming apparatus and an image forming apparatus according to an embodiment of the present invention will be described, with reference to the drawings. FIG. 1 is a perspective view showing an appearance of the image forming apparatus according to the embodiment of the present invention.

The image forming apparatus 1 according to the embodiment of the present invention is a multifunction peripheral having a plurality of functions, such as facsimile transmission, copying, printing, and scanning. As shown in FIG. 1, the image forming apparatus 1 includes a main body 2, an image reading unit 5 located above the main body 2, and a joint portion 3 provided between the image reading unit 5 and the main body 2.

The casing 7 constituting the outer shell of the image forming apparatus 1 accommodates therein a plurality of components that serve to realize various functions of the image forming apparatus 1. For example, the image reading unit 5, an image forming unit 12 (see FIG. 2), a fixing unit, a paper feed unit 30, and a visible image forming unit 50 according to the embodiment of the present invention are provided inside the casing 7.

The image reading unit 5 is an automatic document feeder (ADF) including a document feeder 6, and a scanner that optically reads a source document transported from the document feeder 6 or placed on a non-illustrated contact glass. The image reading unit 5 reads the source documents to be transmitted by facsimile one by one, thereby acquiring image data representing images to be formed.

The image forming unit 12 includes photoconductor drums, charging units, exposure units, developing units, and a transfer unit, and forms (prints) images on a recording sheet delivered from the paper feed unit 30, on the basis of the image read by the image reading unit 5 or print data transmitted from, for example, a personal computer connected to a network. The recording sheet having the image formed thereon undergoes a fixing process performed by the fixing unit, and is discharged to an output tray 4.

The visible image forming unit 50 is configured to form a visible image in the air. (1) The visible image forming unit 50 intermittently emits an invisible laser beam, and generates plasma by collecting the laser beam with lenses and mirrors, to thereby form, in the air, the visible image representing characters and pictures on the basis of the visible light from the plasma thus generated. Such a visible image forming method can be found, for example, in PTL 1 and PTL 2. Alternatively, (2) the visible image forming unit 50 may include an optical image forming device, to receive and reflect light from a display device and converge the reflected light at a position symmetrical to the display device with respect to the optical image forming device, to thereby form an object image in the air. Such a visible image forming method can be found, for example, in PTL 4. In this embodiment, it will be assumed that the visible image forming unit 50 is configured as (1) above.

The operation unit 47 includes, for example, a start key for inputting an instruction to execute a function that the image forming apparatus 1 is configured to perform, a confirmation key (enter key) for fixing a setting inputted through an operation screen represented by the visible image formed by the visible image forming unit 50, and for fixing the operation performed by the operator on the print image represented by the visible image, and numeric keys for inputting numerals.

In addition, an operation detection unit 60 is provided at an end portion of the front face of the image forming apparatus 1. The operation detection unit 60 detects, when the visible image is formed by the visible image forming unit 50, an operation of the operator performed on the print image, in other words a pseudo operation with respect to the visible image. Upon detecting the pseudo operation, the operation detection unit 60 outputs a notice to the effect that the operation has been detected, and the type of the operation (for example, folding or rolling), to a print image processing unit 101 (see FIG. 2).

Further, an operator sensor 80 that detects the operator present within a predetermined range forward of the image forming apparatus 1 is provided at an end portion of the front face of the image forming apparatus 1. The operator sensor 80 is for example an optical sensor including a light emitter and a photodetector, and outputs a detection signal indicating that the operator is present within the predetermined range forward of the image forming apparatus 1, to a controller 100 to be subsequently described, when the photodetector receives the light emitted from the light emitter and reflected by the operator.

Figure 2:
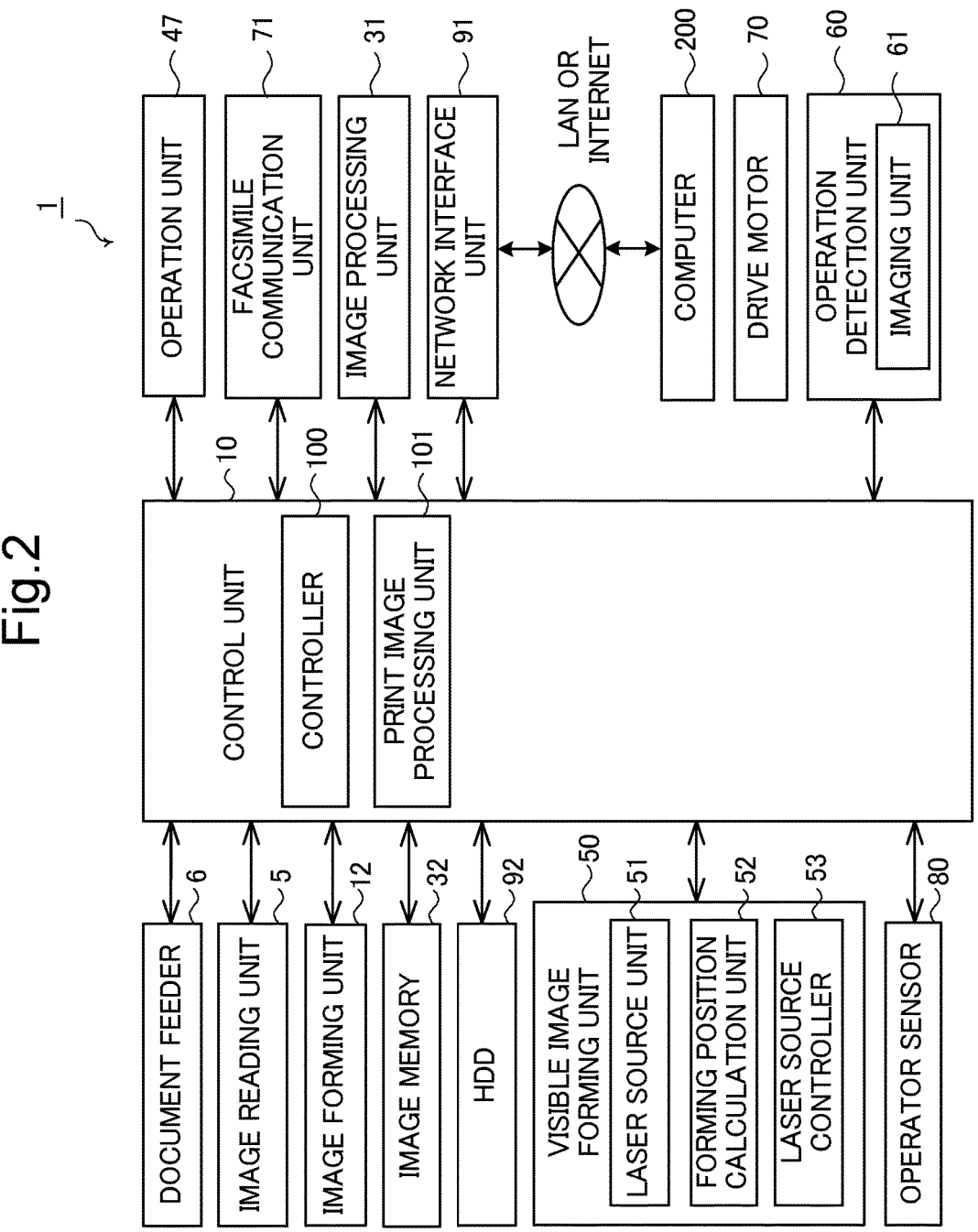
FIG. 2 is a functional block diagram showing an essential internal configuration of the image forming apparatus.

Hereunder, a configuration of the image forming apparatus 1 will be described. FIG. 2 is a functional block diagram showing an essential internal configuration of the image forming apparatus 1.

The image forming apparatus 1 includes a control unit 10. The control unit 10 includes a central processing unit (CPU), a RAM, a ROM, and an exclusive hardware circuit.

The image reading unit 5 includes a reading mechanism having a light emitter, a CCD sensor, and so forth, and is configured to operate under the control of the control unit 10. The image reading unit 5 emits light from the light emitter onto the source document and receives the reflected light with the CCD sensor, thus to read an image from the source document.

The image processing unit 31 processes the data of the image read by the image reading unit 5, as required. For example, the image processing unit 31 performs a predetermined image processing such as shading correction, to improve the image quality after the image is read by the image reading unit 5 and formed by the image forming unit 12.

The image memory 32 is a region for temporarily storing the image data of the source document read by the image reading unit 5, and data to be formed into an image by the image forming unit 12.

The image forming unit 12 forms an image, for example based on the print data read by the image reading unit 5, and the print data received from a computer 200 connected to the network.

The operation unit 47 is used to input instructions of the operator to execute operations and processing that the image forming apparatus 1 is configured to perform.

The visible image forming unit 50 is configured to form a visible image in the air, under the control of the controller 100. In this embodiment, the visible image forming unit 50 intermittently emits an invisible laser beam, and generates plasma by collecting the laser beam with lenses and mirrors, to thereby form, in the air, the visible image representing characters and pictures. The visible image forming unit 50 at least includes a laser source unit 51, a forming position calculation unit 52, and a laser source controller 53.

The laser source unit 51 emits an invisible laser beam under the control of the laser source controller 53. The laser source unit 51 includes a laser source that emits a laser beam, lenses and mirrors that collect the laser beam from the laser source to thereby generate plasma, and a scanning mechanism that allows the laser source, as well as the lenses and mirrors to perform a scanning action.

The forming position calculation unit 52 calculates the emission direction and emission position of the laser beam from the laser source unit 51, so as to allow the visible image representing the screen image received from the controller 100 to be formed at a predetermined visible image forming position (position on a predetermined three-dimensional coordinate system). In other words, the forming position calculation unit 52 calculates the visible image forming position where the laser source unit 51 is to generate the plasma.

The laser source controller 53 controls the laser source unit 51, so as to cause the air present in the emission direction and emission position of the laser beam, calculated by the forming position calculation unit 52, to perform plasma emission. The visible image is generated by luminescent spots that appear at the intersections of two laser beams, and therefore the laser source controller 53 controls the laser source unit 51 so as to adjust the timing to emit the two laser beams such that, for example, the positions of the luminescent spots correspond to the pixels constituting the image.

When a three-dimensional visible image is to be formed, the forming position calculation unit 52 repeatedly calculates and updates the emission direction and the emission position of the laser beam to be realized by the laser source unit 51 in XYZ-directions in the air. The laser source controller 53 controls the laser source unit 51 so that the gas present in the emission direction and at the emission position of the laser beam makes plasma emission, each time the emission direction and the emission position of the laser beam are updated. The laser source controller 53 controls the scanning mechanism of the laser source unit 51 so as to move the lens in the laser emission direction (for example, Z-direction corresponding to depth direction when XY-directions are defined as two-dimensional directions), to thereby change the plasma emission position in the laser emission direction (Z-direction).

The operation detection unit 60 is configured to detect, when the visible image is formed by the visible image forming unit 50 in the predetermined forming position, a pseudo operation simulating a processing operation with respect to the print image formed as visible image. The operation detection unit 60 outputs, to the print image processing unit 101, a notice to the effect that the pseudo operation has been detected, and information indicating the type of processing performed on the print image by the pseudo operation.

In addition, the operation detection unit 60 detects, when the visible image is formed by the visible image forming unit 50 in the predetermined spatial position, the shape of an object that has come close to the print image formed as visible image, and outputs information indicating the shape of the object to the print image processing unit 101.

For example, the operation detection unit 60 includes an imaging unit 61. The imaging unit 61 shoots a predetermined range in a three-dimensional space from the predetermined forming position where the visible image is formed by the visible image forming unit 50. The operation detection unit 60 identifies an image such as the operator's hand or the object and the spatial position of that image, on the basis of the image that has been shot by the imaging unit 61, and detects, when the spatial position of the image is within a predetermined area (for example, within 10 mm in at least one of x, y, and z directions) from the print image formed as visible image in the predetermined forming position, that the pseudo operation is being performed with respect to the print image formed as visible image, and acquires the type of the pseudo operation (for example, folding or rolling).

For example, the operation detection unit 60 processes the image that has been shot by the imaging unit 61, by image thresholding and pattern matching based on shading information, to thereby identify the image of the operator. In this embodiment, the operation detection unit 60 decides whether the shot image contains the image of the operator's hand, by pattern matching between the image of the operator's hand extracted from the shot image and a reference image stored in advance in the operation detection unit 60. Upon identifying the image of the hand, the operation detection unit 60 detects the position of the image as coordinate position on a predetermined three-dimensional coordinate. Then the operation detection unit 60 decides whether any part of the image of the hand overlaps with any part of the predetermined forming position where the print image is formed as visible image. In the case where the image of the hand overlaps with the predetermined forming position, the operation detection unit 60 detects that the pseudo operation is being performed with respect to the print image. The operation detection unit 60 outputs a notice to the effect that the pseudo operation is being performed, and information indicating the type of the pseudo operation, to the print image processing unit 101.

The facsimile communication unit 71 includes an encoding/decoding unit, a modem and a network control unit (NCU), which are not shown, and is configured to transmit a facsimile through the public telephone network.

The network interface unit 91 includes a communication module such as a LAN board, and is configured to transmit and receive data to and from a computer 200 or other devices in the local area, through the LAN connected to the network interface unit 91. A plurality of computers 200 may be connected to the image forming apparatus 1.

The HDD 92 is a large-capacity storage device for storing, for example, the image data of the source document read by the image reading unit 5. The HDD 92 also stores a plurality of screen images each representing an operation screen to be formed into the visible image by the visible image forming unit 50. The image forming apparatus 1 is configured to perform a plurality of predetermined functions such as copying, scanning, facsimile communication, and printing, for each of which an operation screen (screen image), for inputting set values of items that have to be specified to execute the corresponding function, is prepared.

The drive motor 70 serves as a drive source that provides rotational force to rotating components and transport roller pairs in the image forming unit 12.

The operator sensor 80 serves, as already mentioned, to detect the operator present within a predetermined range forward of the image forming apparatus 1.

The control unit 10 includes the controller 100 and the print image processing unit 101.

The control unit 10 acts as the controller 100 and the print image processing unit 101, by acting according to a visible image formation control program installed in the HDD 92. However, the controller 100 and the print image processing unit 101 may each be realized by a hardware circuit, instead of causing the control unit 10 to act according to the visible image formation control program.

The controller 100 is connected to the image reading unit 5, the document feeder 6, the image processing unit 31, the image memory 32, the image forming unit 12, the operation unit 47, the facsimile communication unit 71, the network interface unit 91, the HDD 92, the visible image forming unit 50, the operation detection unit 60, and the operator sensor 80, to control the operation of the mentioned components.

The controller 100 reads out the data to be formed into an image by the image forming unit 12 from the image memory 32, and causes the visible image forming unit 50 to form the visible image representing the print image in the air. The controller 100 also causes the visible image forming unit 50 to form the visible image representing the print image processed by the print image processing unit 101, in the air.

The print image processing unit 101 processes the print image formed in the air by the visible image forming unit 50, according to an operation detected by the operation detection unit 60. For example, when the operation detection unit 60 detects a pseudo operation simulating folding of the print image, the print image processing unit 101 processes the print image so as to fold the same. When the operation detection unit 60 detects a pseudo operation simulating rolling of the print image, the print image processing unit 101 processes the print image so as to roll the same.

Here, the visible image forming unit 50, the controller 100, the operation detection unit 60, and the print image processing unit 101 may be construed as an embodiment of the visible image forming apparatus according to the present invention.

Figure 3:
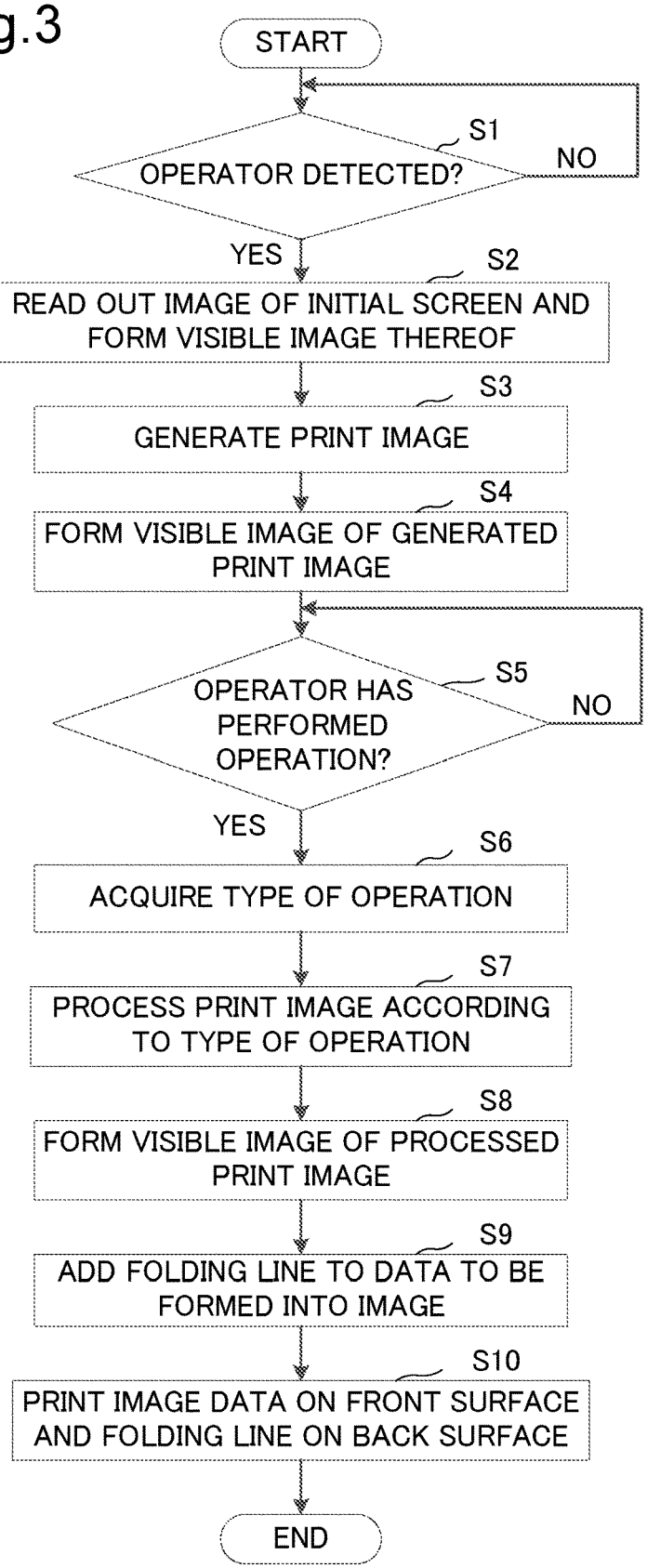
FIG. 3 is a flowchart showing an operation performed by the image forming apparatus.

Hereunder, an example of the operation of the image forming apparatus 1 will be described, focusing on the formation of the visible image in the air by the visible image forming unit 50, the processing of the print image displayed as visible image, and the formation of the image based on the data. FIG. 3 is a flowchart showing an operation performed by the image forming apparatus 1.

For example, when the operator sensor 80 detects that the operator has entered a predetermined area forward of the image forming apparatus 1 (in this embodiment, within a radius of 1 meter in the forward direction from the image forming apparatus 1) (YES at S1), the controller 100 reads out, from the HDD 92, the screen image of the operation screen, which serves as an initial screen, and causes the visible image forming unit 50 to form the visible image representing the screen image of the operation screen which has been read out, in the predetermined spatial position (S2).

When the operator performs a pseudo-touch operation on the operation screen formed in the air by the visible image forming unit 50, and instructs the preview display of the print image, the controller 100 reads out, from the image memory 32, the data to be formed into the image by the image forming unit 12, and generates the print image (S3).

Figure 4:
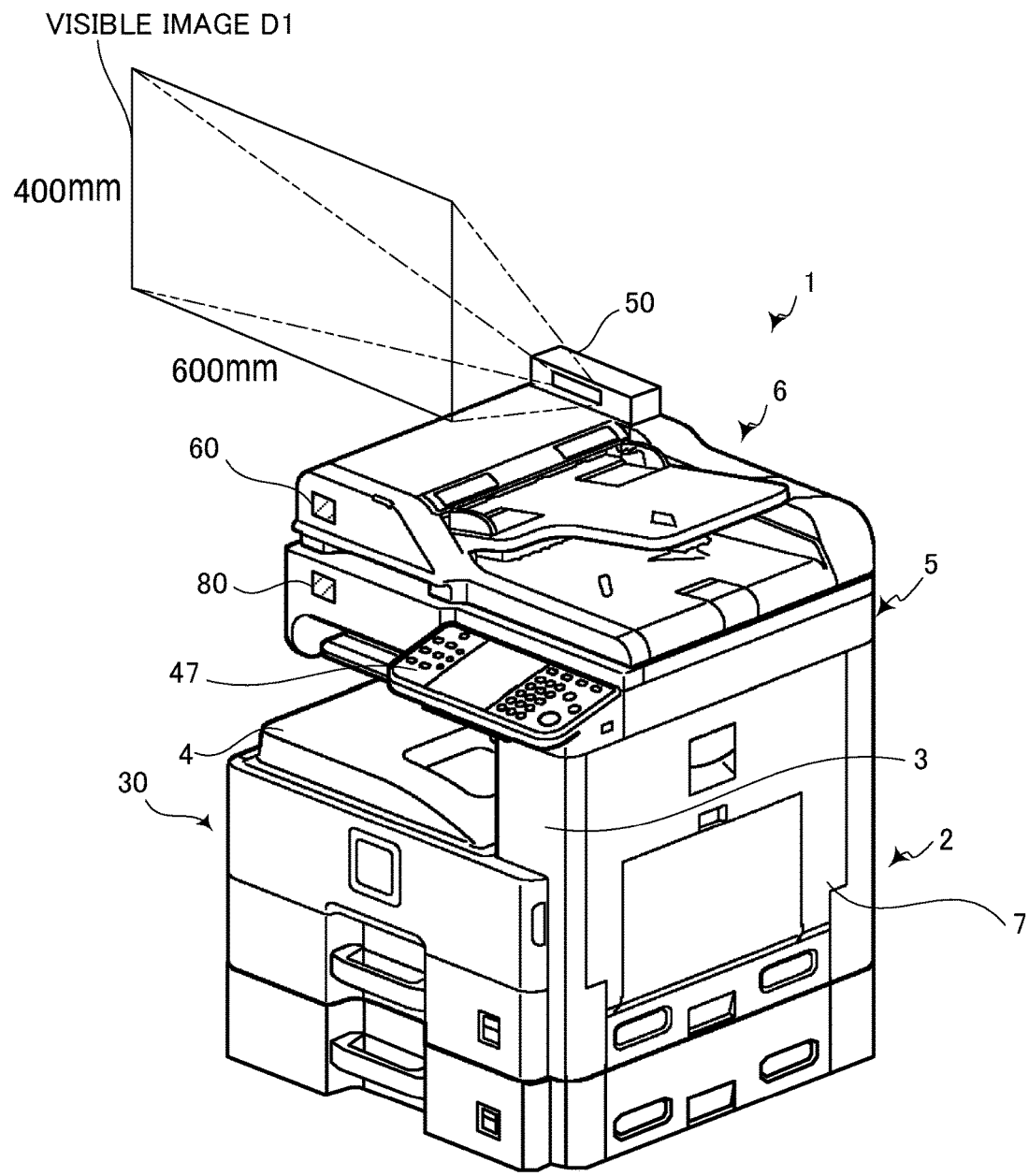
FIG. 4 is a perspective view showing how a visible image representing a print image is formed in the air.
Figure 5:
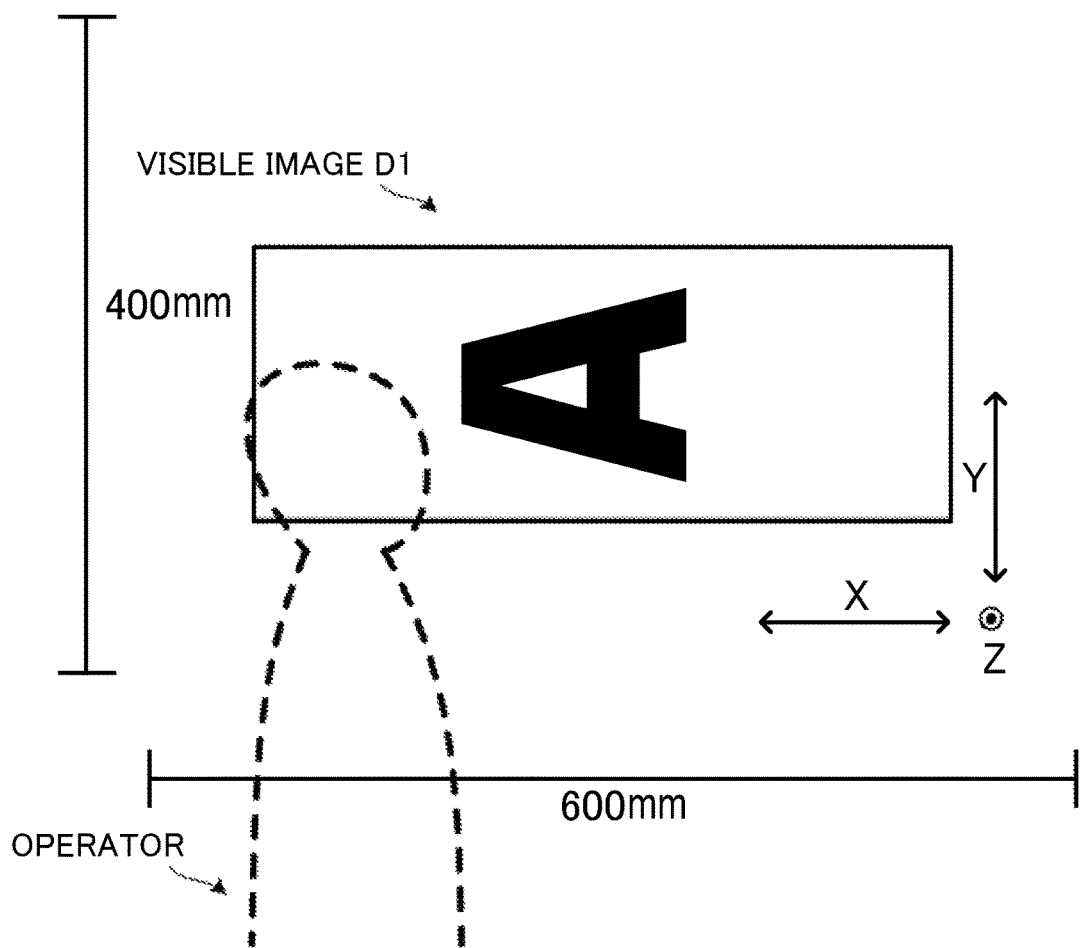
FIG. 5 is a schematic drawing showing how the visible image representing the print image is formed in the air.

FIG. 4 and FIG. 5 illustrate how the visible image representing the print image is formed in the air. As shown in FIG. 4 and FIG. 5, the controller 100 causes the visible image forming unit 50 to form a visible image D1 representing the print image generated as above, in a predetermined spatial position (S4). In this embodiment, the predetermined spatial position where the visible image D1 is to be formed is located forward of the image forming apparatus 1 and in the vicinity of a plane flush with an end portion of the front face of the image forming apparatus 1, and at a height corresponding to the eyes of an operator P1 of an average height.

When the visible image D1 of the print image is thus formed, the visible image D1 is located in a space in front of the eyes of the operator standing forward of the image forming apparatus 1 as shown in FIG. 5, and therefore the visible image D1 is easier for the operator to visually recognize, than the case of viewing the print image, for example, displayed on a display unit of the image forming apparatus 1, such as an LCD screen. The visible image D1 representing the print image may be formed, for example, in a region having a size of 400 mm in height by 600 mm in width, so that the print image can be viewed in the same size printed on the actual paper sheet.

When the operator performs an operation for processing the print image formed in the air as visible image D1, for example folding or rolling (pseudo operation), the operation detection unit 60 detects the pseudo operation (YES at S5), and the print image processing unit 101 acquires the type of the operation (S6). Upon receipt of the type of the operation performed by the operator from the operation detection unit 60, the print image processing unit 101 performs the processing corresponding to the type of the operation, on the print image (S7). Then the controller 100 causes the visible image forming unit 50 to form the visible image representing the print image processed by the print image processing unit 101 (S8).

Figure 6:
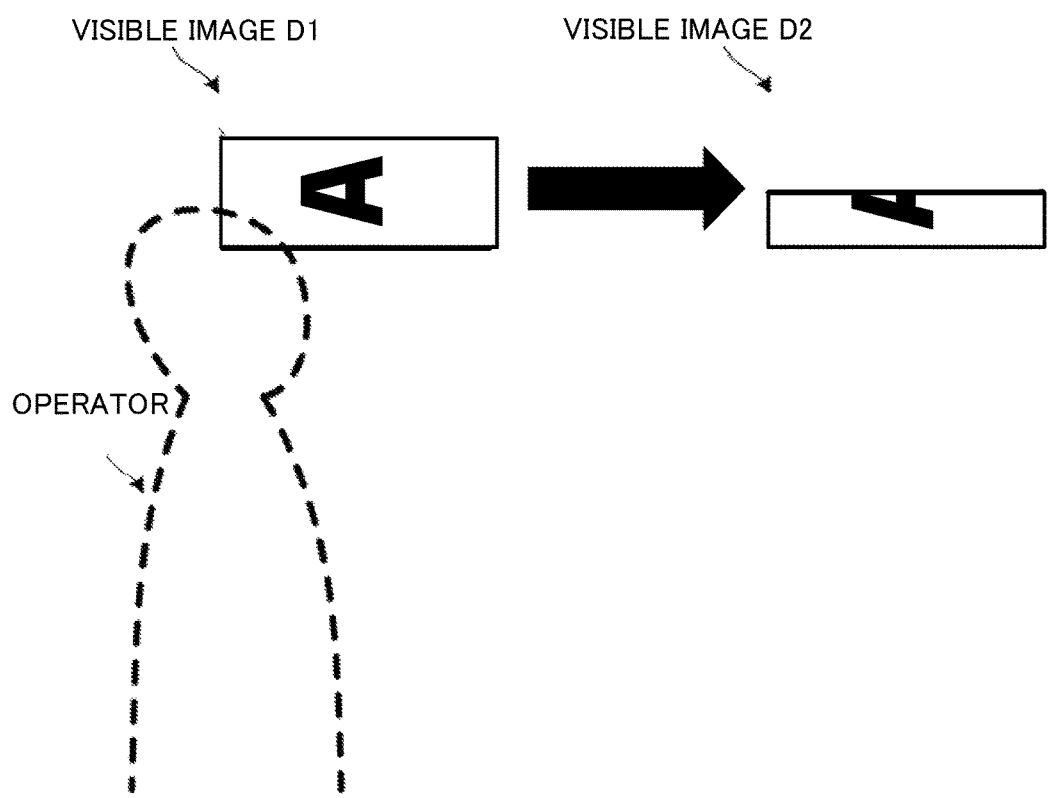
FIG. 6 is a schematic drawing showing an operation performed on the print image formed in the air, and the print image processed according to the operation.

FIG. 6 is a schematic drawing showing the operation performed on the print image formed in the air, and the print image processed according to the operation. For example, when the operator makes an action of holding the print image displayed as visible image D1 with the fingers and folding the print image, the operation detection unit 60 detects such an action and notifies the action to the print image processing unit 101.

Upon receipt of the notice of the operation to fold the print image displayed as visible image D1 from the operation detection unit 60, the print image processing unit 101 processes the print image so as to fold the same, thereby generating a new print image assuming the folded state. The controller 100 then causes the visible image forming unit 50 to form a visible image D2 in the air, representing the print image processed as above by the print image processing unit 101.

The operation to fold the print image may be performed, for example, by linearly sliding the finger along the visible image D1 in the X-direction, at a desired position in the Y-direction. When such an operation is detected by the operation detection unit 60, the controller 100 causes the print image processing unit 101 to generate the print image to be displayed as visible image D2, representing the visible image D1 folded in the Z-direction, corresponding to the depth direction when viewed from the operator, along the straight line drawn in the X-direction.

The processing performed on a given print image is also applied to other images. For example, when the preview of another print image is displayed after a print image is folded, such another print image is also displayed in the folded state as visible image in the air.

When the print instruction is made thereafter, the image forming unit 12 forms the image on the recording medium (paper sheet). In this case, the controller 100 causes the print image processing unit 101 to add the folding line according to the processing of the print image performed by the print image processing unit 101 (S9), and causes the image forming unit 12 to print the image data on the front surface of the recording medium, and the folding line on the back surface thereof (S10).

Figure 7:
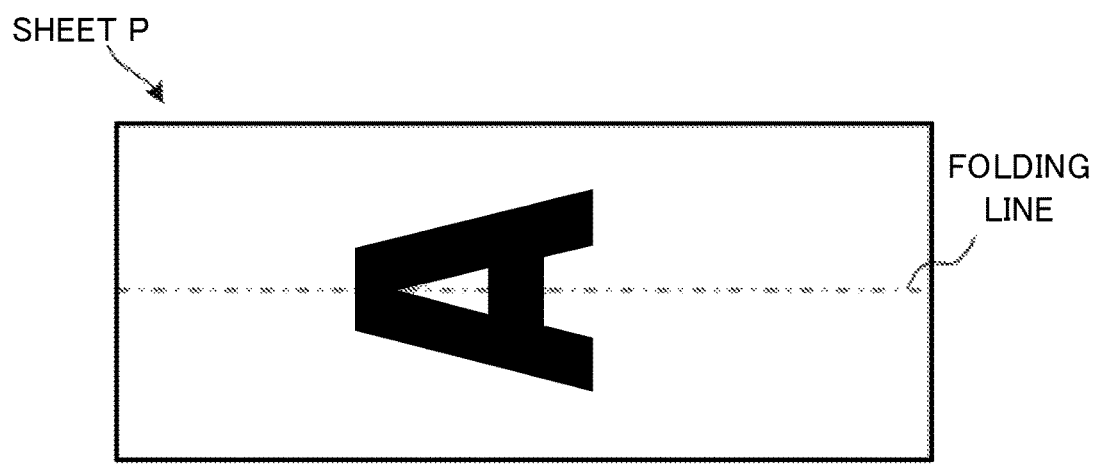
FIG. 7 is a schematic drawing showing a recording sheet on which the operation performed on the print image formed in the air is reflected.

FIG. 7 is a schematic drawing showing a recording sheet on which the operation performed on the print image formed in the air is reflected. When the print image is folded, for example as shown in FIG. 6, the controller 100 causes the image forming unit 12 to print the image on the front surface of the paper sheet, and the folding line (for example, dash-dot line indicating valley fold) on the back surface. When the operator folds the actual printed material along the folding line, the same effect as the operation performed on the print image can be obtained. Here, the operator can freely select whether to print the folding line on the back surface.

Figure 8:
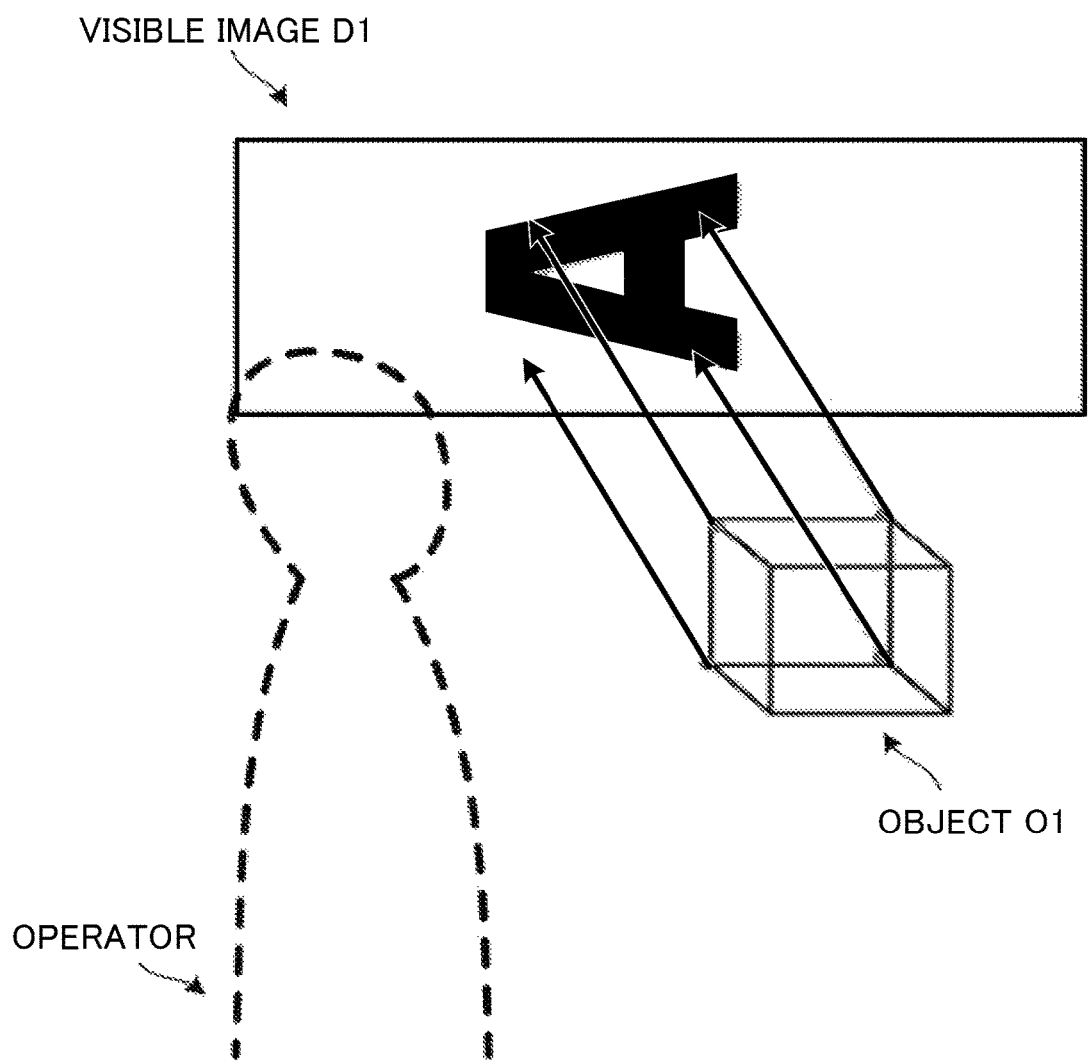
FIG. 8 is a schematic drawing showing an object being brought closer to the print image formed in the air.
Figure 9:
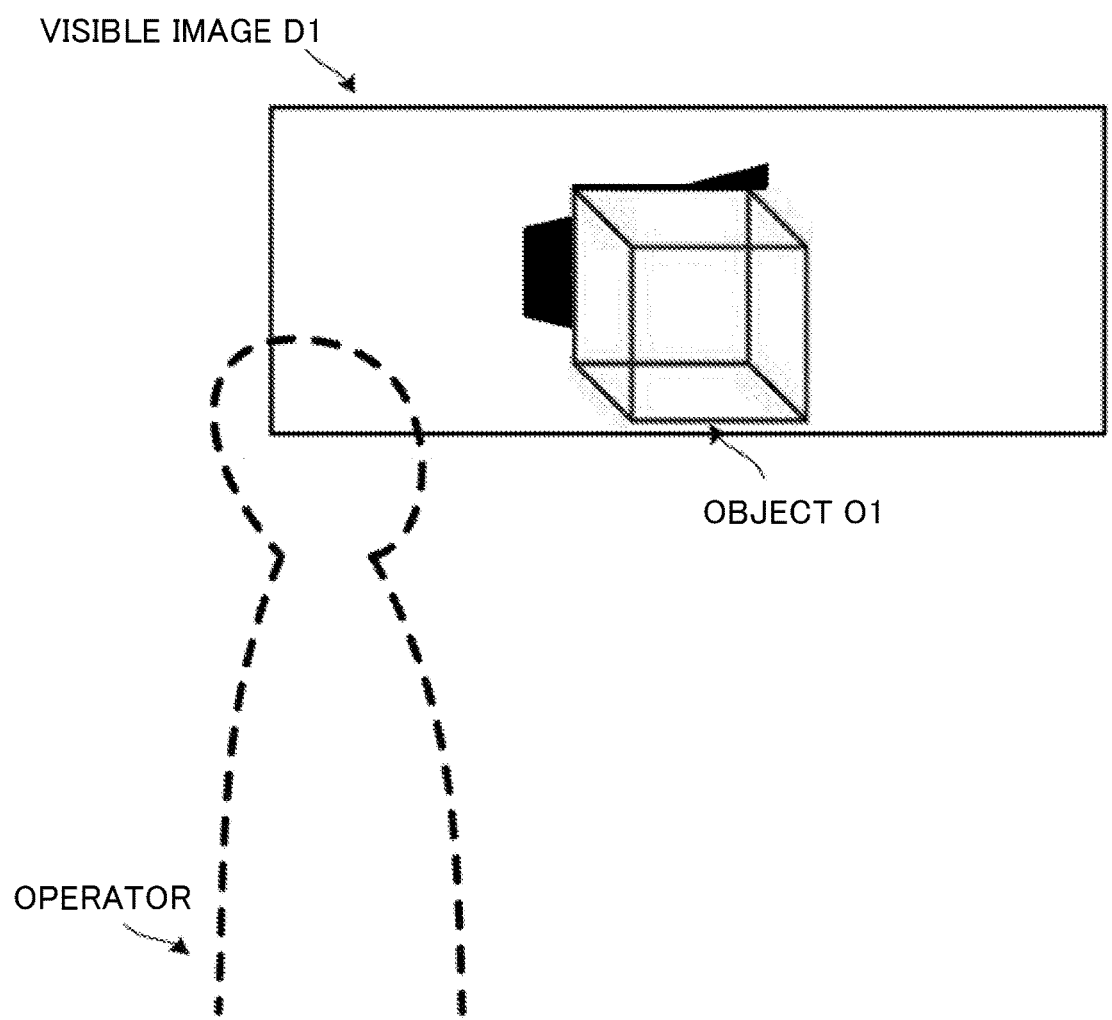
FIG. 9 is a schematic drawing showing how the shape of the object that has come close to the print image formed in the air is recognized.

Another example of the operation that can be performed at step S5 is folding the print image so as to cover the surface of an object. FIG. 8 is a schematic drawing showing the object being brought closer to the print image formed in the air. FIG. 9 is a schematic drawing showing how the shape of the object that has come close to the print image formed in the air is recognized. As shown in FIG. 8, when the operator brings an object O1 close to the visible image D1 while the visible image D1 representing the print image is formed in the air, the operation detection unit 60 recognizes the shape of the object O1 when the object O1 is superposed on the visible image D1, and outputs the information of the shape to the print image processing unit 101.

Figure 10:
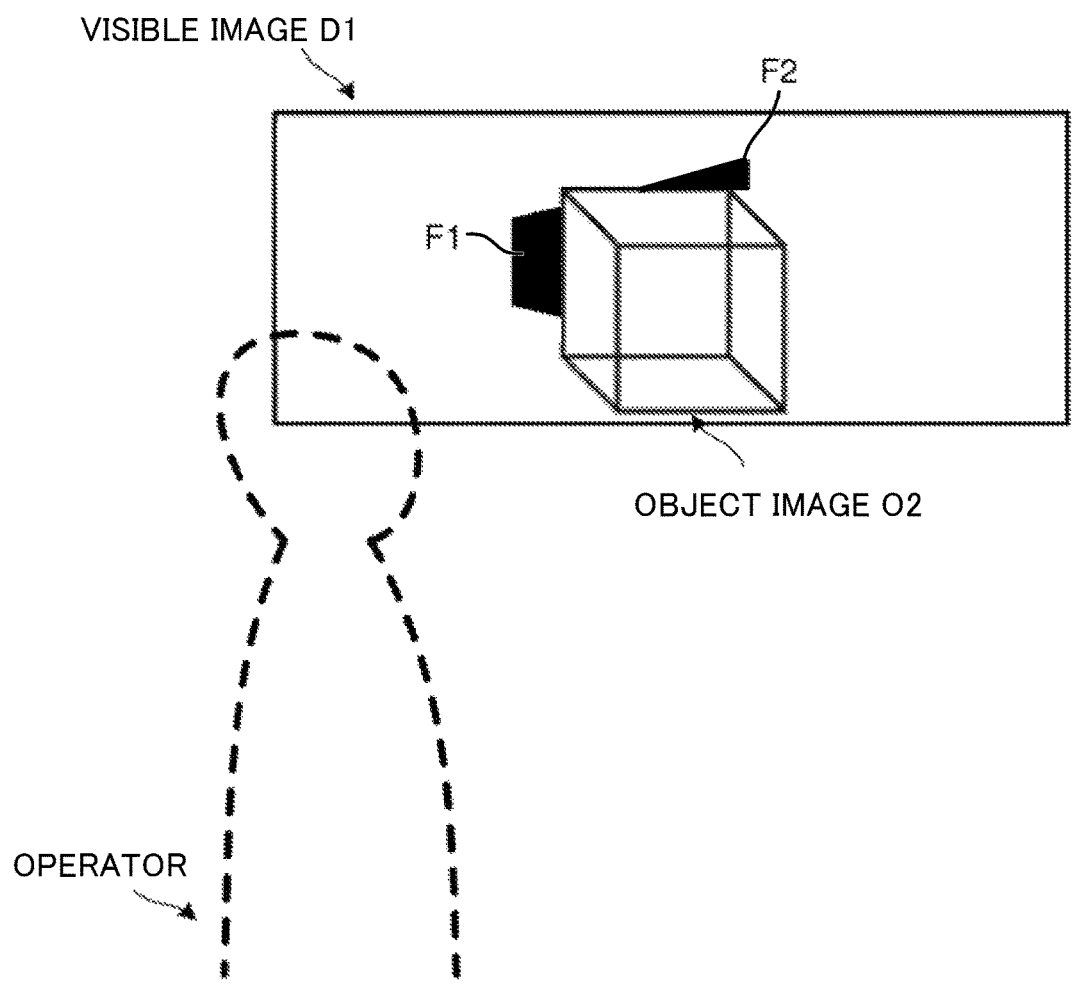
FIG. 10 is a schematic drawing showing an operation performed on the print image and the object image formed in the air.

FIG. 10 is a schematic drawing showing the operation performed on the print image and the object image formed in the air. The print image processing unit 101 generates an object image O2 representing the shape of the object O1 according to the information of the shape acquired from the operation detection unit 60, and the visible image forming unit 50 forms the visible image of the object image O2 in the air.

When the operator holds the print image displayed as visible image D1 with the fingers and folds the print image along the surface of the object image O2, the operation detection unit 60 detects the folding operation and notifies the print image processing unit 101 that such operation has been performed. The folding operation may be performed by bringing a region of the visible image D1 into contact with one of the surfaces of the object O1. When such operation is performed, the operation detection unit 60 detects XY region information indicating the contact area between the visible image D1 and the surface of the object O1 (object image O2), and the print image processing unit 101 processes the print image so as to apply the contact area indicated in the visible image D1 to the object O1. Further, the print image processing unit 101 generates a stereoscopic print image in which the portions of the visible image D1 other than the contact area F1, F2 (see FIG. 10) are folded in the Z-direction along the object image O2, according to the shape information acquired from the operation detection unit 60 when generating the object image O2.

Figure 11:
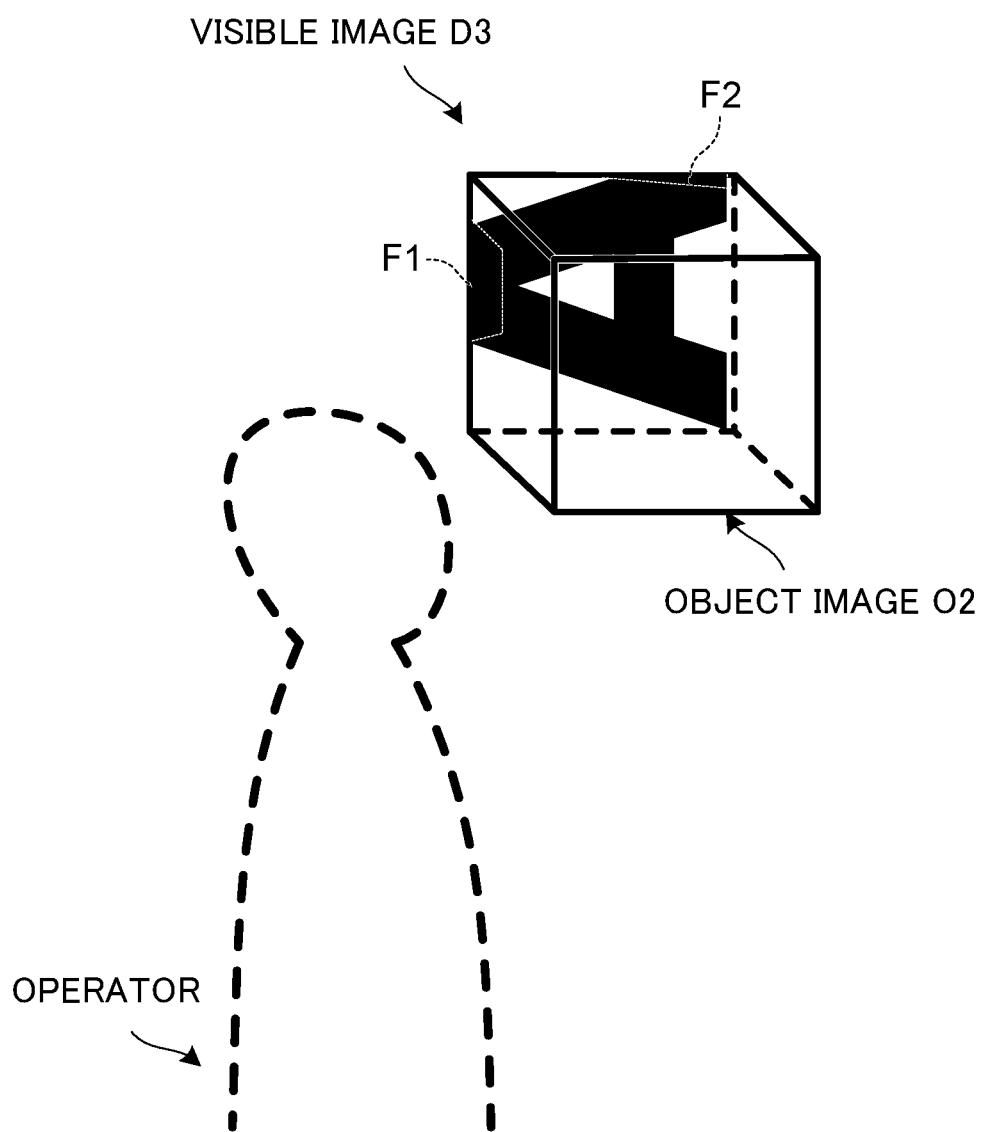
FIG. 11 is a schematic drawing showing the print image processed according to the operation performed on the print image formed in the air.

Upon receipt of the notice from the operation detection unit 60 that the operation to fold the print image displayed as visible image D1 has been detected, the print image processing unit 101 processes the print image so as to fold the same along the surfaces of the object image O2, thereby generating a new print image assuming the folded state. FIG. 11 is a schematic drawing showing the print image processed according to the operation performed on the print image formed in the air. The controller 100 then causes the visible image forming unit 50 to form a visible image D3 in the air, representing the print image processed as above by the print image processing unit 101.

When the print instruction is made thereafter, the controller 100 causes the print image processing unit 101 to add the folding lines to the positions to be folded in the data to be formed into the image, according to the processing of folding the print image along the surfaces of the object image O2, and causes the image forming unit 12 to print the image data on the front surface of the recording medium, and the folding lines on the back surface thereof.

In this case, the print image processing unit 101 may scale up or scale down the image representing the print image covering the surfaces of the object image O2 as shown in FIG. 11, according to a scale-up or scale-down instruction corresponding to the operation detected by the operation detection unit 60. The controller 100 causes the image forming unit 12 to print the enlarged or reduced image, according to the instruction of the operator. Such an arrangement allows, for example when an object is to be wrapped with a printed material, the printed state to be predicted by processing the print image formed in the air so as to change the size of the image, thereby eliminating the need to repeatedly print the image in different sizes.

The present invention is not limited to the foregoing embodiment, but may be modified in various manners. For example, although the visible image forming apparatus is exemplified by the image forming apparatus 1 in the foregoing embodiment, the present invention is broadly applicable to various electronic apparatuses other than the image forming apparatus 1.

Although the image forming apparatus according to the foregoing embodiment is exemplified by the color MFP, the present invention may also be applied to a monochrome MFP or other electronic apparatuses including other types of image forming apparatuses, such as a printer, a copier, and a facsimile machine.

Further, the configurations and processing according to the foregoing embodiment, described above with reference to FIG. 1 to FIG. 11, are merely exemplary and in no way intended to limit the configurations and processing of the present invention.

The invention claimed is:

1. A visible image forming apparatus comprising:
   a visible image forming unit that forms a visible image in the air;
   a controller that causes the visible image forming unit to form the visible image representing a print image;
   an operation detection unit that detects an operation of an operator performed on the print image displayed as the visible image by the visible image forming unit; and
   a print image processing unit that processes the print image according to the operation detected by the operation detection unit,
   wherein the controller causes the visible image forming unit to form, in the air, the visible image representing the print image processed by the print image processing unit,
   the operation detection unit detects a predetermined folding operation performed by the operator on the print image,
   the print image processing unit generates, upon receipt of a notice of the folding operation from the operation detection unit, a new print image representing a folded state of the print image formed as visible image in the air, and
   the controller causes the visible image forming unit to form, in the air, a visible image representing the print image newly generated by the print image processing unit.

2. A visible image forming apparatus comprising:
   a visible image forming unit that forms a visible image in the air;
   a controller that causes the visible image forming unit to form the visible image representing a print image;

an operation detection unit that detects an operation of an operator performed on the print image displayed as the visible image by the visible image forming unit; and a print image processing unit that processes the print image according to the operation detected by the operation detection unit, wherein the controller causes the visible image forming unit to form, in the air, the visible image representing the print image processed by the print image processing unit, the operation detection unit recognizes a shape of an object brought close to the print image displayed as the visible image by the visible image forming unit, the print image processing unit generates an object image representing the shape of the object recognized by the operation detection unit, and processes the print image so as to cover a surface of the object image, and the controller causes the visible image forming unit to form, in the air, a visible image representing the print image processed by the print image processing unit so as to cover the surface of the object image.

3. The visible image forming apparatus according to claim 2, wherein, when the operation detection unit detects the operation of the operator to scale up or scale down the processed print image, the print image processing unit scales up or scales down the object image and the processed print image, according to the detected operation to scale up or scale down, and the controller causes the visible image forming unit to form, in the air, a visible image scaled up or scaled down, and representing the object image and the print image.

4. An image forming apparatus comprising:

the visible image forming apparatus according to claim 3; and an image forming unit that forms an image on a recording medium, wherein the controller causes the image forming unit to form an image on a basis of the print image scaled up or scaled down by the print image processing unit to be formed into the visible image.

5. An image forming apparatus comprising:

a visible image forming apparatus that comprises:

a visible image forming unit that forms a visible image in the air;

a controller that causes the visible image forming unit to form the visible image representing a print image;

an operation detection unit that detects an operation of an operator performed on the print image displayed as the visible image by the visible image forming unit; and a print image processing unit that processes the print image according to the operation detected by the operation detection unit, wherein the controller causes the visible image forming unit to form, in the air, the visible image representing the print image processed by the print image processing unit; and an image forming unit that forms an image on a recording medium, wherein the controller causes the visible image forming unit to form, in the air, the visible image representing the print image based on image data to be formed into an image by the image forming unit.

6. The image forming apparatus according to claim 5, wherein the controller causes the image forming unit to form an image representing the image data to which a folding line is added according to the processing performed by the print image processing unit on the print image.

* * * * *